US006301557B1

(12) United States Patent
Miller et al.

(10) Patent No.: US 6,301,557 B1
(45) Date of Patent: Oct. 9, 2001

(54) METHOD AND APPARATUS FOR SHARING OBJECTS AND OBJECT STATE BETWEEN PROCESSES

(75) Inventors: Michael R. Miller, Roselle; Collin P. O'Brien, Mokena, both of IL (US); Sylvain Boucher, Ste-Julienne; Chantal Tremblay, Repentigny, both of (CA)

(73) Assignee: Compaq Computers Incorporated, Houston, TX (US)

( * ) Notice: Subject to any disclaimer, the term of this patent is extended or adjusted under 35 U.S.C. 154(b) by 0 days.

(21) Appl. No.: 09/132,945

(22) Filed: Aug. 11, 1998

(51) Int. Cl.[7] .................................................. G06F 15/173
(52) U.S. Cl. ............................................ 704/223; 704/316
(58) Field of Search .................................... 709/202, 223, 709/224, 315, 316, 317

(56) References Cited

U.S. PATENT DOCUMENTS

| | | | | |
|---|---|---|---|---|
| 5,367,635 | * | 11/1994 | Bauer et al. | 709/221 |
| 5,452,433 | * | 9/1995 | Nihart et al. | 709/223 |
| 5,611,050 | * | 3/1997 | Theimer et al. | 709/202 |
| 5,751,962 | * | 5/1998 | Fanshier et al. | 709/223 |
| 5,781,736 | * | 7/1998 | Schmidt | 709/224 |
| 5,790,789 | * | 8/1998 | Suarez | 709/202 |
| 5,822,585 | * | 10/1998 | Noble et al. | 709/300 |
| 5,832,224 | * | 11/1998 | Fehskens et al. | 709/223 |
| 5,933,601 | * | 8/1999 | Fanshier et al. | 395/200.53 |
| 5,983,016 | * | 11/1999 | Brodsky et al. | 395/701 |
| 6,049,828 | * | 4/2000 | Dev et al. | 709/224 |
| 6,052,722 | * | 4/2000 | Taghadoss | 709/223 |
| 6,061,721 | * | 5/2000 | Ismael et al. | 709/223 |
| 6,067,559 | * | 5/2000 | Allard et al. | 709/202 |
| 6,101,500 | * | 8/2000 | Lau | 707/103 |

* cited by examiner

*Primary Examiner*—Dung C. Dinh
*Assistant Examiner*—Nkosi Trim
(74) *Attorney, Agent, or Firm*—Fenwick & West LLP

(57) ABSTRACT

A method and apparatus for integrating management agents and EM frameworks is provided. For a representative embodiment, the present invention includes an open enterprise management gateway or OEM gateway. The OEM gateway is a software process that functions as an intermediary between one or more management agents and one or more EM frameworks. The OEM gateway includes a set of APIs that allow management agents to export object hierarchies to EM frameworks. The EM frameworks create interactive displays using the exported object hierarchies. The interactive displays allow users to invoke command interfaces for the displayed objects. When command interfaces are invoked, the EM frameworks invoke a callback request API within the OEM server. The OEM server then directs callback processing to an API exported by the appropriate management agent.

18 Claims, 3 Drawing Sheets

METHOD AND APPARATUS FOR SHARING OBJECTS AND OBJECT STATE BETWEEN PROCESSES

FIELD OF THE INVENTION

The present invention relates generally to object oriented programming methodologies. More specifically, the present invention includes a method and apparatus that provides object oriented interfaces between enterprise management frameworks and management agents that interact with enterprise management frameworks.

BACKGROUND OF THE INVENTION

The growth in size and complexity of computer networks has made network management an increasingly difficult task. As a result, a number of software applications have been developed to automate management of computer systems and networks. These applications are referred to in this document as management agents. Management agents are designed to allow the state of entities, such as computer systems, disks and processes, to be remotely monitored and managed. Many management agents perform these functions on a network wide basis. This allows large numbers of entities within a network to be centrally analyzed and managed.

Most management agents have been developed to manage specific entity types. As a result, a single computer network may include several different management agents. For example, a representative network may use a first management agent to manage disks and a second management agent to manage software applications. This complicates the network management task by forcing network operators to learn and use the features of several different management agents.

Enterprise management frameworks (also known as EM frameworks) are software applications that have been developed to simplify the use of different management agents. To accomplish this end, EM frameworks attempt to provide a single, unified interface to different management agents. An effective method for providing this type of interface is to treat entities, such as computer systems, disks and processes, as objects. The objects within a computer network may then be grouped into a hierarchy. The object hierarchy provides a structure that may be visually navigated. Objects within the hierarchy can be manipulated to manage their associated entities.

The unified interface provided by EM frameworks greatly simplifies the task of network management. As a result, it is generally desirable to extend EM frameworks to provide this interface for a wide range of management agents. Unfortunately, providing this type of cross-compatibility between EM frameworks and management agents can be complex. This complexity results, partially, because each management agent and each EM framework will typically have its own programming interface. Integrating an EM framework with a group of management agents means adapting the programming interfaces of the framework and each agent. This work may have to be redone if a new EM framework or agent is used or if an updated programming interface is provided for an existing EM framework or agent. Effectively, when traditional methods are used, EM frameworks and management agents form part of a closed architecture. These architectures are expensive to implement, expensive to maintain, and expensive to adapt or upgrade.

Integrating multiple management agents with EM frameworks may also result in complex runtime problems. As an example, consider the case where two management agents both report status for a particular entity. A question arises as to how an EM framework will proceed if the two management agents do not agree on the status of the entity. Furthermore, where multiple management agents are used, it may be difficult for the EM framework to determine which management agent should process a given user command.

Integrating multiple management agents with EM frameworks also tends to increase the number of objects that must be managed. In large networks, this may increase the number of managed objects to the point that an EM framework would provide unacceptable performance or require unacceptable initialization periods.

Based on the preceding discussion, it may be appreciated that there is a need for systems that facilitate the integration of management agents and EM frameworks. It is important for systems of this type to be inexpensive to implement, inexpensive to maintain, and inexpensive to adapt or upgrade. These systems need to correctly report entity status and correctly direct user commands. These systems also need to scale to large network environments without suffering unacceptable performance degradation.

SUMMARY OF THE INVENTION

The present invention provides a method and apparatus for integrating management agents and EM frameworks. For a representative embodiment, the present invention includes an open enterprise management gateway or OEM gateway. The OEM gateway is a software process that functions as an intermediary between one or more management agents and one or more EM frameworks. The OEM gateway includes an OEM server and a series of EM adapters. Each EM adapter provides an interface between the OEM gateway and a particular type of EM framework.

There are two interfaces between the OEM server and a given management agent. The first of these interfaces, known as the OEM request interface, is exported by the OEM server and used by the management agent. The second, known as the client callback interface, is exported by the management agent and used by the OEM server. Both of these interfaces are constructed to conform to predefined application programming interfaces (APIs). Adapting a particular management agent to work with the OEM gateway requires configuring the management agent to use the OEM request interface and to export a client callback interface.

There are two interfaces between the OEM server and a given EM adapter agent. The first of these interfaces, known as the adapter request interface, is exported by the EM adapter and used by the OEM server. The second, known as the OEM callback interface, is exported by the OEM server and used by the EM adapter. Both of these interfaces are constructed to conform to predefined application programming interfaces (APIs). Adapting a particular EM adapter to work with the OEM gateway requires configuring the EM adapter to provide an adapter request interface and to use the OEM callback interface.

Once configured, an EM framework or management agent may be used in combination with any EM framework or management agent that has been adapted to use the OEM gateway. Effectively, the APIs of the OEM gateway provide an open architecture for EM framework/management agent interaction. The open architecture simplifies the task of adding new or changed EM frameworks or management agents.

During operation, a group of one or more management agents uses the OEM gateway to interact with a group of one or more EM frameworks. Management agents use the OEM request interface to add objects to the EM frameworks. Each object corresponds to an entity, such as a computer system, disk or process. The EM frameworks display, using their own native interfaces, the objects added by the management agents. When appropriate, the management agents use the OEM request interface to define and associate command interfaces, such as popup menus, with the objects within the EM frameworks.

Users trigger the command interfaces associated with the objects in an EM framework to interact with the underlying entities. In response, the EM framework uses the OEM callback interfaces to invoke callback procedures within the appropriate management agents. The callback procedures perform the steps required to effectuate the operation requested by the user.

The OEM gateway provides arbitration between different EM frameworks and different management agents. As an example, if two or more management agents report different status information for a single object, the OEM gateway determines which information should be forwarded to the EM frameworks. Arbitration also allows the OEM gateway to correctly direct callback processing to the correct management agents.

The OEM gateway maintains an internal depth variable. The depth variable is user-configurable and describes the preferred depth for the hierarchy of objects created by the management agents. Management agents may access the depth variable to determine the preferred depth for their object hierarchies. This decreases the probability that management agents will add objects in numbers that exceed the performance capabilities of the EM frameworks.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

ENVIRONMENT

Figure 1:
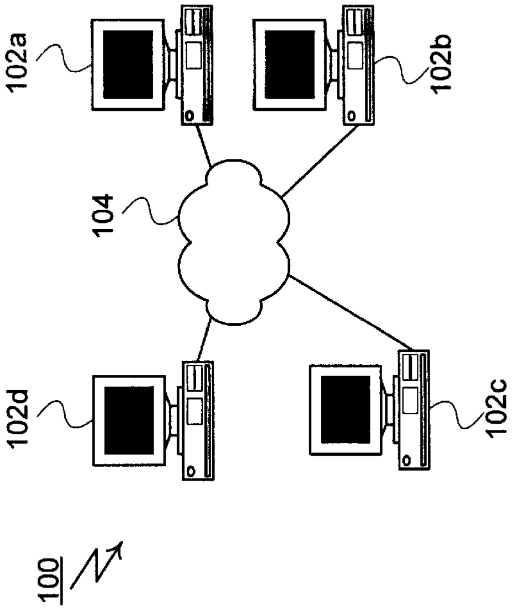
FIG. 1 is a block diagram of a computer network or cluster shown as an exemplary environment for an embodiment of the present invention.

In FIG. 1, a computer network 100 is shown as a representative environment for the present invention. Structurally, computer network 100 includes Ma series of nodes, of which nodes 102*a* through 102*d* are representative. Nodes 102 are intended to be representative of a wide range of computer system types including personal computers, workstations and mainframes. Although four nodes 102 are shown, computer network 100 may include any positive number of nodes 102. Nodes 102 may operate under distinct operating system types.

Figure 2:
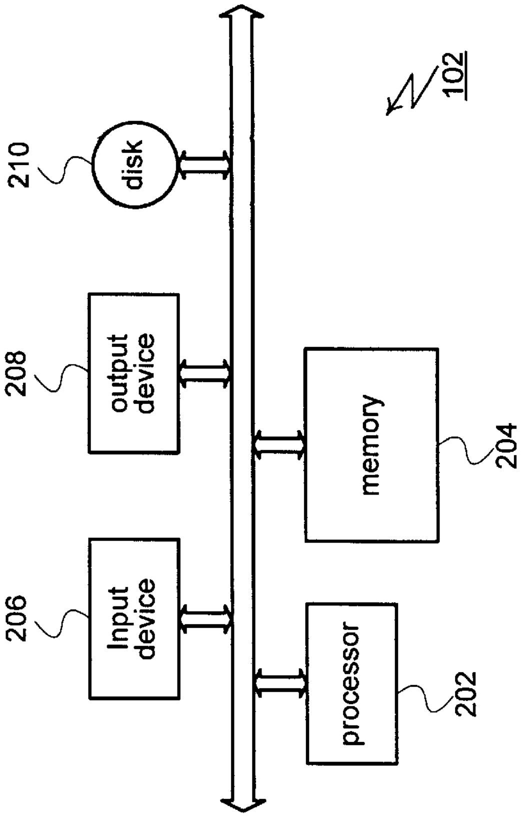
FIG. 2 is a block diagram of an exemplary computer system as used in the computer network of FIG. 1.

Nodes 102 are interconnected via computer network 104. Network 104 is intended to be representative of any number of different network types. As shown in FIG. 2, each node 102 includes a processor, or processors 202, and a memory, or memories 204. An input device 206 and an output device 208 are connected to processor 202 and memory 204. Input device 206 and output device 208 represent a wide range of varying I/O devices such as disk drives, keyboards, modems, network adapters, printers and displays. Each node 102 also includes a disk drive 210 of any suitable disk drive type (equivalently, disk drive 210 may be any non-volatile storage system such as "flash" memory).

OPEN ENTERPRISE MANAGEMENT GATEWAY

Figure 3:
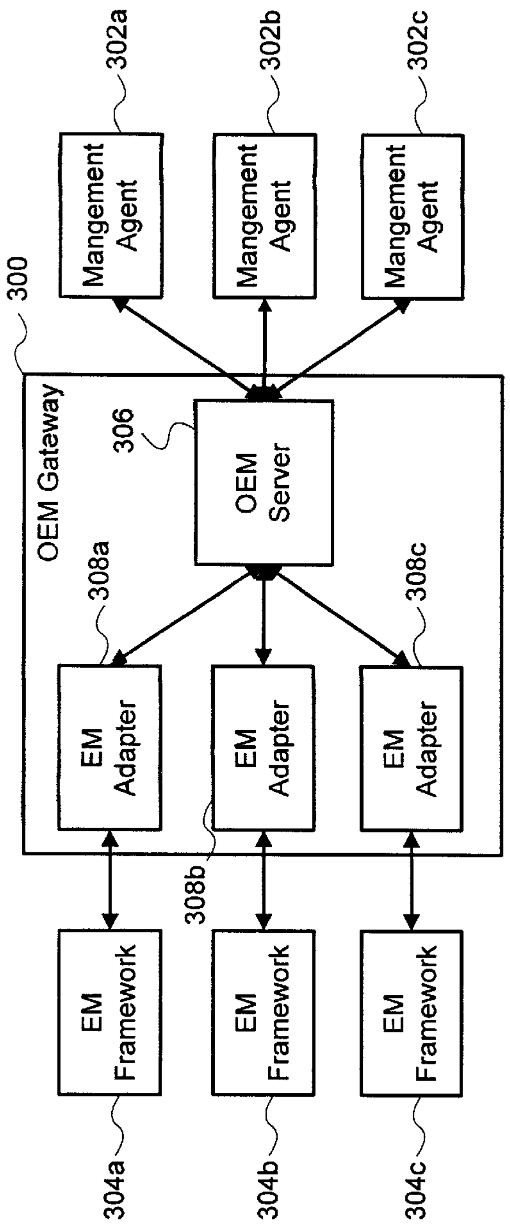
FIG. 3 is a block diagram of an embodiment of the OEM gateway of the present invention, shown with a representative set of management agents and EM frameworks.

The present invention provides a method and apparatus for integrating management agents and EM frameworks. For a representative embodiment, the present invention includes an open enterprise management gateway (OEM) of the type designated 300 in FIG. 3. OEM gateway 300 is a software process that functions as an intermediary between one or more management agents 302 and one or more EM frameworks 304. OEM gateway 300 is partitioned into an OEM server 306 and a series of EM adapters of which EM adapters 308*a* through 308*c* are representative. OEM server 306 communicates with management agents 302 and performs processing that is independent of the particular EM frameworks 304 being used. Each EM adapter 308 provides an interface between OEM server 306 and a respective EM framework 304. Unlike OEM server 306, EM adapters 308 are EM framework specific. This means that EM adapters 308 perform processing that is dependent on their particular EM framework 304.

Management agents 302 use OEM gateway 300 to export data to EM frameworks. The exported data describes the entities that the management agents 302 manage. Preferably, this data is exported in the form of a hierarchy of objects. A representative object hierarchy of this type is designated 400 in FIG. 4. Object hierarchy 400 includes a series of objects 402*a* through 402*h*. Each object 402 represents an entity, such as a computer system, disk or process. Each object 402 has a name. For example, object 402*a* has the name "San Francisco." Object 402*h* has the name "two." Objects 402 are arranged into hierarchical levels. The hierarchical arrangement means that each object 402 has a pathname. The pathname of an object 402 corresponds to the location of the object 402 in the object hierarchy 400. In the case of object 402*h*, for example, the pathname is "\San Francisco\Disk.".

Objects 402 within object hierarchy 400 may have associated states. A state is a numeric value. States are typically used to described the operational status of objects 402. As an example, numeric states corresponding to "normal", "marginal" or "bad" may be assigned to describe the operational status of DISK objects 402*f*, 402*g*, and 402*h*. Different objects 402 and different types of objects 402 may have different states.

Objects 402 within object hierarchy 400 may have associated command interfaces. As an example, a representative command interface 404 is associated with CPU object 402*d*. In this example, command interface 404 is a popup menu that acts on the associated object 402. In the case of representative command interface 404, the command interface includes two options: "restart" and "halt." Different objects 402 and different types of objects 402 may have different command interfaces 404. Command interfaces 404 may be associated with specific objects 402. Command interfaces 404 may also be defined to apply to a specified object 402 and all of its descendent objects 402. Finally, command interfaces 404 may be defined generically. Generically defined command interfaces 404 apply to a class of objects 402 that share a common name. As an example, it may be assumed that a command interface 404 has been defined for a class of objects 402 having the name "DISK." In this case, the command interface would apply to object 402*c* and its descendants (objects 402*f*, 402*g* and 402*h*). The same command interface 404 would apply to all other similar objects 402 in object hierarchy 400. Thus, if objects 402 for a second system, such as "\Chicago" where included in object hierarchy, the example command interface 404 would apply to disk objects 402 included for that system. It should be noted that there is an order of precedence between command interfaces 404. Thus, a command interface 404 defined specifically for an object 402 takes precedence over a command interface 404 defined for one of the ancestors of the object 402 or a class that includes the object 402.

Figure 4:
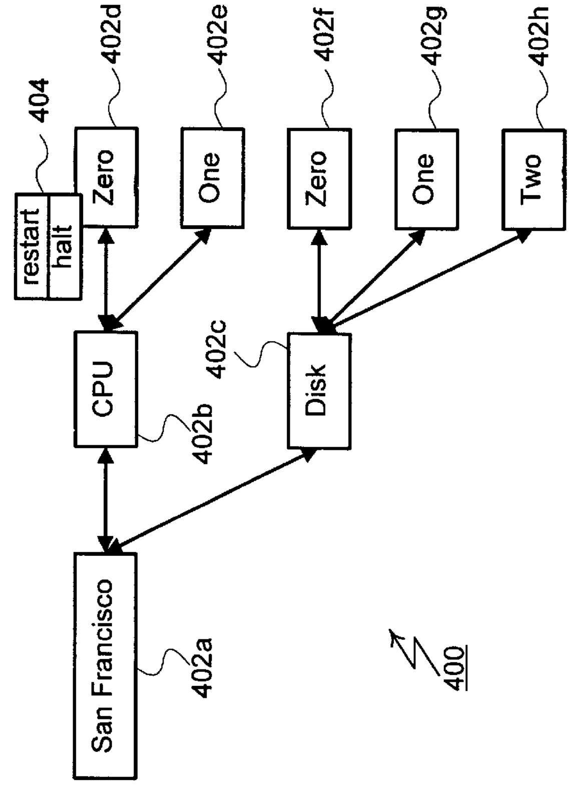
FIG. 4 is a block diagram of an object hierarchy as used by an embodiment of the present invention.

As previously described, management agents 302 use OEM gateway 300 to export data, in the form of object hierarchies 400, to OEM gateway 300. OEM gateway 300 forwards the exported object hierarchies 400 to EM frameworks 304. EM frameworks 304 use the exported object hierarchies 400 to create interfaces to the entities managed by the exporting management agents 302. These interfaces typically take the form of a navigable hierarchy that bears some resemblance to object hierarchy 400 as shown in FIG. 4. Examples of these navigable hierarchies include the MICROSOFT EXPLORER-style interface provided by the OBJECT INTEGRATION LAYER (OIL) of TANDEM COMPUTERS INC. Displays using Java, HTML or other web-based technologies are also suitable. In other cases, still other display formats will be used.

EM frameworks 304 may use the state information associated with objects 402 to modify their displays. As an example, EM frameworks 304 may color objects 402 according to their states to indicate "normal", "marginal" or "bad" operational conditions. EM frameworks 304 also preferably provide some type of interface that allows users to view and select the options included in command interfaces 404. Typically, but not necessarily, this interface will provide command interfaces that interact with a mouse or other pointing device. Other interfaces may be used, however, without departing from the present invention.

EM frameworks 304 respond to user selection of options within command interfaces 404 by notifying OEM gateway 300. OEM gateway 300, in turn, passes these notifications on to management agents 302. Management agents 302 invoke callback objects to perform the steps required by the command interface options selected by the users of EM frameworks 304.

Figure 5:
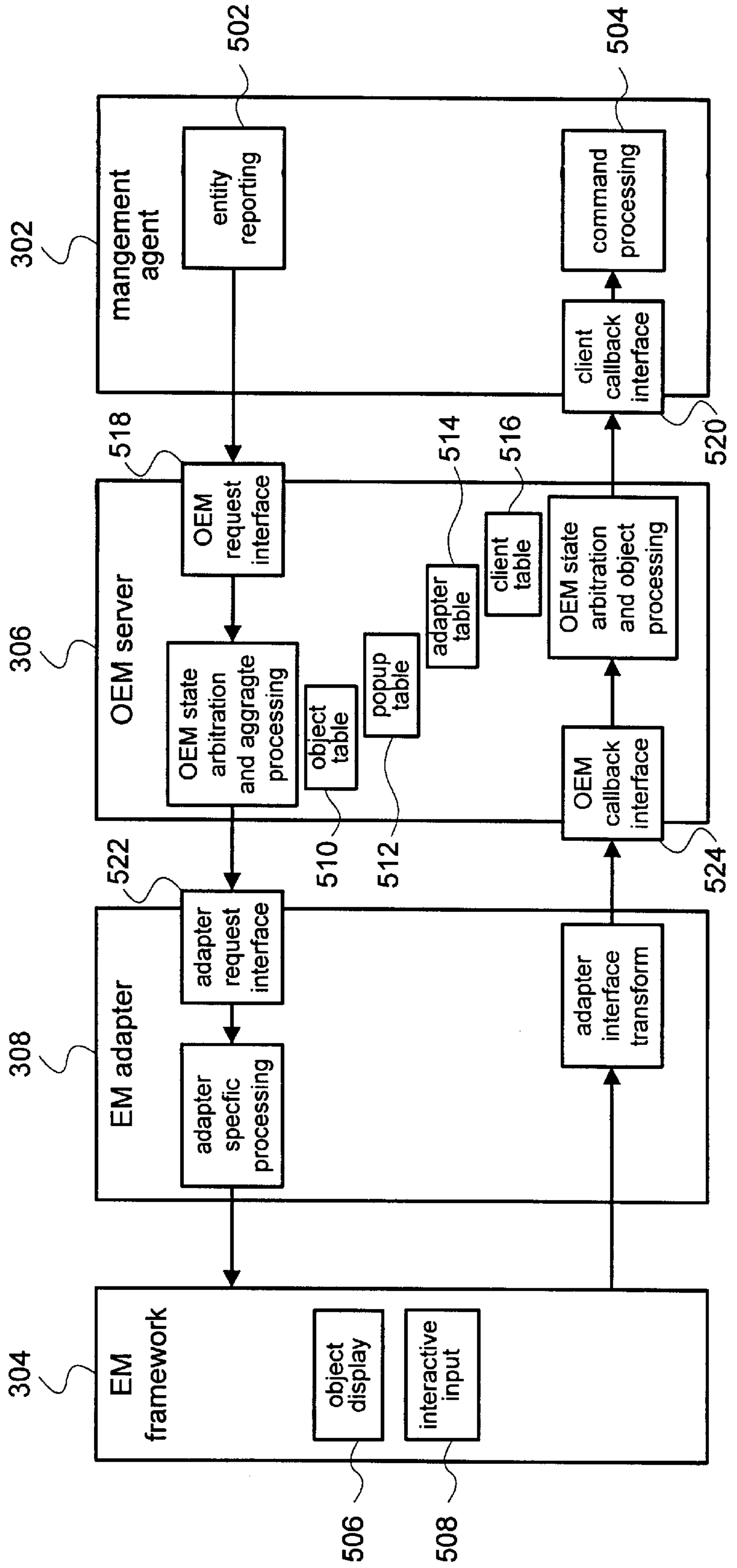
FIG. 5 is a block diagram showing internal components of an embodiment of the OEM gateway of the present invention, shown with a representative management agent and EM framework.

The use of OEM gateway 300 to export object hierarchies 400 and to direct callback processing is better appreciated by reference to FIG. 5. In FIG. 5, a representative management agent 302, OEM server 306, EM adapter 308 and EM framework 304 are shown. Representative management agent 302 includes an entity reporting module 502 and a command processing module 504. Entity reporting module 502 represents the portion of management agent 302 that is configured to use OEM gateway 300 to export object hierarchy 400 to EM frameworks 304. Command processing module 504 represents the portion of management agent 302 that responds to commands sent by EM frameworks 304 and OEM gateway 300. Representative EM framework 304 includes an object display module 506 and an interactive input module 508. Object display module 506 represents the portion of EM framework 304 that is configured to receive and display object hierarchy 400 from EM adapter 308. Interactive input module 508 represents the portion of EM framework 304 that is configured to receive interactive input from a user and perform appropriate callbacks using EM adapter 308.

To perform its role as an intermediary, OEM server 306 maintains a series of tables. These tables include an object table 510, a popup table 512, an adapter table 514 and a client table 516. Object table 510 includes a series of data structures that describe the objects 402 that have been exported by management agents 302. Each of these data structures is an instance of an ObjectInfo class. OEM server 306 constructs ObjectInfo instances on a permanagement agent 302 basis. Thus, if two management agents 302 export the same object 402, OEM server 306 will construct two separate instances of the ObjectInfo class. It should be noted that OEM server 306 constructs instances of the ObjectInfo class only for objects 402 that have actually been exported by management agents 302. OEM server 306 does not construct instances of the ObjectInfo class for objects 402 that are implied by the pathname of an exported object 402. Thus, where a management agent 302 exports objects \W\X\Y and \W\X\Z, OEM server 306 creates ObjectInfo instances for Y and Z but not for W or X. Instances of the ObjectInfo class include the following elements:

| Element Name | Data Type |
|---|---|
| Path | Character String |
| ObjectName | Character String |
| ClientName | Character String |
| CallbackObject | OLE Callback Object |
| State | Integer |
| Context | Character String |

The path element within an ObjectInfo instance is the path of the associated object 402 within object hierarchy 400. The path is preferably stored within ObjectInfo instances to allow the path to be rapidly retrieved. In following sections of this document, it will be seen that ObjectInfo instances are actually stored in a hierarchical n-way tree. Some embodiments of OEM server 306 may be configured to reconstruct the path element of ObjectInfo instances by traversing this tree. This reduces memory usage by eliminating the path element included in ObjectInfo instances. In most cases, however, the decreased memory usage will not outweigh the increased runtime associated with reconstructing the path element.

The ObjectName element within an ObjectInfo instance is the name of the object 402 associated with the ObjectInfo instance.

The management agent 302 that exports an object 402 supplies a client name. The client name is a character string defined by the exporting management agent 302. An individual management agent 302 may use multiple client names to subdivide or categorize its exported objects 402. OEM server 306 records the client name supplied for an object 402 in the ClientName element of the ObjectInfo instance created for the object 402. The use of client names will be more fully described in later parts of this document.

The management agent 302 that exports an object 402 may supply a callback object. The callback object is an OLE object defined by the exporting management agent 302. The identity of any callback object supplied for an exported object 402 is recorded by OEM server 306 within the CallbackObject element of the ObjectInfo instance created for that object 402. When a user activates a command interface 404 within an EM framework 304, the EM framework 304 sends a callback request (using the appropriate EM adapter 308) to OEM server 306. If the CallbackObject element has been defined for the object 402 for which the command interface 404 was invoked, OEM server 306 directs callback processing to that OLE object. If the CallbackObject element is not defined for the object 402 for which the command interface was invoked, OEM server 306 will direct callback processing to a callback object that is defined for the command interface 404. If no callback object is defined for the command interface 404, OEM server 306 will direct callback processing to a default callback object that is defined for the management agent 302 that exported the command interface 404.

The state element within an ObjectInfo instance is the numeric state of the object 402 as defined by the exporting management agent 302. The context element within an ObjectInfo instance is the context of the object 402 as defined by the exporting management agent 302.

OEM server organizes the instances of the ObjectInfo class into a hierarchical n-way tree using a second series of data structures. Each of these data structures is an instance of an ObjectNode class. OEM server 306 constructs ObjectNode instances on a management agent 302 independent basis. Thus, if two management agents 302 export the same object 402, OEM server 306 will construct a single instance of the ObjectNode class. OEM server 306 also constructs instances of the ObjectNode class for objects 402 that are implied by the pathname of an exported object 402. Thus, where a management agent 302 exports objects \W\X\Y and \W\X\Z, OEM server 306 creates ObjectNode instances for W and X as well as Y and Z. Instances of the ObjectInfo class include the following elements:

| Element Name | Data Type |
|---|---|
| Path | Character String |
| ObjectName | Character String |
| ObjectInfoList | List of ObjectInfo objects |
| ObjectNodeList | List of ObjectNode objects |
| Parent | ObjectNode object |
| PropagatedOwner | ObjectNode object |
| PropagatedState | Integer |
| PropagatedClient | Character String |
| PropagatedContext | String |
| PropagatedClient | OLE Callback Object |

The path element within an ObjectNode instance is the path of the associated object 402 within object hierarchy 400. The path is preferably stored within ObjectNode instances to allow the path to be rapidly retrieved. Some embodiments may be configured to dynamically construct this information by ascending the n-way tree of ObjectNode instances. Storing this information within each ObjectNode class instance avoids the runtime penalty associated with this type of traversal.

The ObjectName element within an ObjectNode instance is the name of the object 402 associated with the ObjectNode instance.

The ObjectInfoList element within an ObjectNode instance is a list of ObjectInfo class instances. OEM server 306 stores the ObjectInfo instance(s) for each exported object 402 within the ObjectInfoList element of the ObjectNode instance associated with the exported object 402. Thus, if three management agents 302 export objects \W\X\Y, OEM server will store the three ObjectInfo instances created for these objects 402 within the ObjectInfoList element of the ObjectNode instance created for the object WWY. In cases where OEM server 306 has created an ObjectNode instance for an object 402 that is implied by the pathname of an exported object 402, the ObjectInfoList element of that ObjectNode instance will be set to null.

The ObjectNodeList element within an ObjectNode instance is a list of ObjectNode class instances. OEM server 306 stores the pointers to the children of each ObjectNode class instance within the ObjectNodeList element of the ObjectNode instance. Thus, where a management agent 302 exports objects \W\X\Y and \W\X\Z, OEM server 306 stores pointers to the ObjectNode instances of Y and Z in the ObjectNodeList element of the ObjectNode instance of X.

The Parent element within an ObjectNode instance is a pointer to an ObjectNode class instance. OEM server 306 stores a pointer to the parent of each ObjectNode class instance within the Parent element of the ObjectNode instance. Thus, where a management agent 302 exports object \W\X\Y, OEM server 306 stores a pointer to the ObjectNode instance of X in the Parent element of the ObjectNode instance of Y.

The PropagatedOwner element within an ObjectNode instance is a pointer to an ObjectNode class instance. For each ObjectNode instance, OEM server 306 selects the descendent ObjectNode class instance having the highest reported state. OEM server 306 stores a pointer to this selected descendent within the PropagatedOwner element of the ObjectNode instance. By storing propagation data at each ObjectNode instance, OEM server 306 is able to handle changes to descendent ObjectNode instances (i.e., changes to objects 402) rapidly. OEM server 306 uses the propagation data to limit changes to the portions of the n-way tree that are potentially impacted by changes to objects 402.

For each ObjectNode instance, OEM server 306 selects the descendent ObjectNode class instance having the highest reported state. OEM server 306 sets the PropagatedState, PropagatedClient, PropagatedContext and PropagateCallback of the ObjectNode instance to reflect the attributes of the selected descendent. Specifically, OEM server 306 stores the state of the selected descendent in the PropagatedState element. OEM server 306 stores the name of the management agent 302 that exported the object 402 associated with the selected descendent in the PropagatedClient element. OEM server 306 OEM server 306 stores the context of the selected descendent in the PropagatedContext element. OEM server 306 OEM server 306 stores the callback object associated with the the selected descendent in the PropagatedCallback element.

The popup table 512 included within OEM server 306 is an organized list of PopupInfo class instances. Each PopupInfo class instance describes a single command interface 404 that has been exported to OEM server 306. Each PopupInfo class instance includes the following elements:

| Element Name | Data Type |
|---|---|
| ClientName | Character String |
| ObjectName | Character String |
| MenuCaption | Character String |
| CallbackCommand | Character String |
| CallbackObject | OLE Callback Object |
| AppEXEName | Character String |
| CallbackClassName | Character String |
| CallbackType | Character String |

The management agent 302 that exports a command interface 404 supplies a client name. The client name is a character string defined by the exporting management agent 302. An individual management agent 302 may use multiple client names to subdivide or categorize its exported command interface 404. OEM server 306 records the client name supplied for a command interface 404 in the ClientName element of the PopupInfo instance created for the object 402. The use of client names will be more fully described in later parts of this document.

The ObjectName element within a PopupInfo instance is the pathname of an object 402 or objects 402. This pathname defines the object 402 or objects 402 to which the command interface 404 associated with the PopupInfo instance applies. The command interface 404 associated with a PopupInfo instance applies to the object 402 identified by the ObjectName element. Alternatively, the ObjectName element may define a generic class of objects 402 to which the command interface 404 associated with a PopupInfo instance applies. The command interface 404 associated with a PopupInfo instance also applies to the all objects 402 that are descendants of the object 402 identified by the ObjectName element.

The MenuCaption element within a PopupInfo instance is the caption that will appear on any actual command interface 404. When a user activates a command interface 404 within an EM framework 304, the EM framework 304 sends a callback request (using the appropriate EM adapter 308) to OEM server 306. The callback requests includes the name of the object 402 for which the command interface 404 was invoked. The callback request also includes the pathname for the same object 402 and the menu caption for the invoked command interface 404. OEM server 306 uses this information, along with the ObjectName and MenuCaption elements to locate a matching PopupInfo instance. To perform this task, OEM server 306 first determines if popup table 512 includes a PopupInfo instance having ObjectName and MenuCaption elements that match the pathname and menu caption of the callback request. If no matching PopupInfo instance exists, OEM server 306 extracts the rightmost element of the pathname included in the callback request (i.e., Z for \X\Y\Z). OEM server 306 then determines if popup table 512 includes a PopupInfo instance having an ObjectName element that matches the extracted rightmost element. This process is repeated until a matching PopupInfo instance is located. In this way. OEM server 306 searches for PopupInfo instances that are specifically associated or generically associated with the pathname included in the callback request.

The management agent 302 that exports a command interface 404 may supply a callback string. The callback string is a character string defined by the exporting management agent 302. OEM server 306 records the callback string supplied for a command interface 404 within the CallbackString element of the PopupInfo instance of that command interface 404. When a user activates a command interface 404 within an EM framework 304, the EM framework 304 sends a callback request (using the appropriate EM adapter 308) to OEM server 306. As part of processing this request, OEM server 306 determines if a callback string has been supplied for the activated command interface 404. In cases where a callback string has been supplied, the callback string is forwarded to the management agent 302 that exported the command interface 404.

The management agent 302 that exports a command interface 404 may supply a callback object. The callback object is an OLE object defined by the exporting management agent 302. The identity of any callback object supplied for a command interface 404 is recorded by OEM server 306 within the CallbackObject element of the PopupInfo instance created for that command interface 404. When a user activates a command interface 404 within an EM framework 304, the EM framework 304 sends a callback request (using the appropriate EM adapter 308) to OEM server 306. During callback processing OEM server 306 first determines if a callback object has been associated with the object 402 for which the command interface 404 was invoked. If no callback object has been associated with that object 402, OEM server 306 determines if the CallbackObject element is defined within the PopupInfo instance of the activated command interface 404. If the. CallbackObject element is defined, OEM server directs callback processing to that OLE object. If no callback object is defined for the command interface 404, OEM server 306 will direct callback processing to the default callback object for the management agent 302 that exported the command interface 404.

The AppEXEName element within a PopupInfo instance is the program file name of the management agent 302 that exported the command interface 404 associated with the PopupInfo instance. OEM server 306 can use this information to restart the management agent 302 if the management agent 302 fails.

The CallbackClassName element within a PopupInfo instance is an OLE class name. This class name is registered by the management agent 302 that exported the command interface 404 associated with the PopupInfo instance. The class name identifies the class within the management agent 302 to which callback processing for the command interface 404 is directed. When necessary, OEM server 306 can use this information to create a new instance of the callback object. OEM server 306 can create new callback class instances as part of recovery following failure of a management application 302.

The CallbackClassType element within a PopupInfo instance controls how the command interface 404 associated with the PopupInfo instance is invoked. For typical embodiments of the present invention, this element can take on a range of values. No value, or null means that the command interface 404 is only invoked when the user specifically selects the command interface 404 from a menu. Other values mean that the command interface 404 is invoked by single or double clicking an object 402 associated with the command interface 404.

The adapter table 514 included within OEM server 306 is an organized list of AdapterInfo class instances. Each AdapterInfo class instance describes a single EM adapter 308 that has been configured for use with OEM server 306. Each AdapterInfo class instance includes the following elements:

| Element Name | Data Type |
|---|---|
| AdapterName | Character String |
| ClassName | Character String |
| AdapterInterfaceObject | OLE Object |
| OEMCallbackObject | OLE Callback Object |
| State | Integer |
| Priority | Integer |

The AdapterName element within an AdapterInfo instance is the name of the EM adapter 308 associated with the AdapterInfo instance.

The ClassName element within an AdapterInfo instance is an OLE class name. This class name is registered by the EM adapter 308 associated with the AdapterInfo instance. The class name identifies the class within the EM adapter 308 that is configured to interact with OEM server 306. OEM server 306 uses this class name during initialization of the EM adapter 308 to create an instance of the interface object. Subsequently, this interface object is used to pass object 402 and command interface 404 information to the EM adapter 308.

The AdapterInterfaceObject element within an AdapterInfo instance is an OLE object. OEM server 306 stores the interface object created using the ClassName in the AdapterInterfaceObject element.

The OEMCallbackObject element within an AdapterInfo instance is an LE callback object. This callback object identifies the callback object within EM server 306 that EM adapter 308 uses to perform callback processing. For he described embodiment, OEM server 306 maintains a separate callback object for each EM adapter 308.

The State element within an AdapterInfo instance describes the state (e.g., active, inactive, or not-installed) of the EM adapter 308 associated with the AdapterInfo instance.

The Priority element within an AdapterInfo instance describes the priority of the EM adapter 308 associated with the AdapterInfo instance relative to other EM adapters 308. EM server 306 exports objects 402 and command interfaces 404 to EM adapters 308 in priority order.

The client table 516 included within OEM server 306 is an organized list of ClientInfo class instances. Each ClientInfo class instance describes a single management agent 302 that has been configured for use with OEM server 306. Each ClientInfo class instance includes the following elements:

| Element Name | Data Type |
|---|---|
| ClientName | Character String |
| DefaultCallbackObject | OLE Callback Object |
| AppEXEName | Character String |
| CallbackClassName | Character String |
| RequestInstanceID | Integer |

The ClientName element within a ClientInfo instance is the name of the management agent 302 associated with the ClientInfo instance.

The DefaultCallbackObject element within a ClientInfo instance is an OLE callback object. This callback object identifies the default callback object within management agent 302 associated with the ClientInfo instance. When processing a callback, OEM server 306 first determines if a callback object exists for the object 402 for which the callback is being performed. If so, OEM server 306 uses that callback object to perform callback processing. If no callback object exits for the object 402, OEM server 306 determines if a callback object exists for the command interface for which the callback is being performed. If so, OEM server 306 uses that callback object to perform callback processing. If no callback object exits for the object 402 or the command interface 404, OEM server uses the default callback object, stored in the DefaultCallbackObject element, to perform callback processing.

The AppEXEName element within a ClientInfo instance is the program file name of the management agent 302 associated with the ClientInfo instance. OEM server 306 can use this information to restart the management agent 302 if the management agent 302 fails.

The CallbackClassName element within a ClientInfo instance is an OLE class name. This class name is registered by the management agent 302 associated with the ClientInfo instance. The class name identifies the class within the management agent 302 to which default callback processing is directed. When necessary, OEM server 306 can use this information to create a new instance of the callback object. OEM server 306 can create new callback class instances as part of recovery following failure of a management application 302.

Management agents 302 communicate with OEM server 306 using an OEM request interface 518. OEM request interface 518 is a dynamically created OLE object. OEM request interface 518 is constructed in conformance to a predefined OEM request API.

The RequestinstanceID element within a ClientInfo instance is the instance identifier of the OEM request interface 518 used by the management agent 302 associated with the ClientInfo instance. OEM server 306 uses the RequestinstanceID element to track the true ownership of objects 402 and command interfaces 404. If a management agent 302 terminates, without removing its exported objects 402 and command interfaces 404, OEM server 306 can determine which objects 402 and command interfaces 404 should be removed during cleanup.

The communication between management agent 302, OEM server 306, EM adapter 308 and EM framework 304 is performed using a series of interfaces. Each of these interface is constructed to conform to a predefined API. Two of these interfaces, an OEM request interface 518 and a client callback interface 520 are positioned between management agent 302 and OEM server 306. Two more interfaces, an adapter request interface 522 and an OEM callback interface 524, are positioned between OEM server 306 and EM adapter 308.

OEM request interface 518 defines the communication interface between entity reporting module 502 and OEM server 306. Entity reporting module 502 exports and maintains object hierarchy 400 using OEM request interface 518. This interface is implemented by and exported from OEM server 306. This interface is constructed to conform to an OEM request API.

Client callback interface 520 defines the communication interface between OEM server 306 and command processing module 504. OEM server 306 forwards callback requests (that originate within EM framework 304 or within OEM server 306 itself, as the result of users interacting the with Alerts or Max Alerts windows) to command processing module 504 using client callback interface 520. This interface is implemented by and exported from management agent 302. This interface is constructed to conform to a client callback API.

Adapter request interface 522 and OEM callback interface 524 define the communication interface between OEM server 306 and EM adapter 308. OEM server 306 forwards object hierarchy 400 (as received from entity reporting module 502) to EM adapter 308 using adapter request interface 522. EM adapter 308 forwards callback requests (that originate within EM framework 304) to OEM server 306 using OEM callback interface 524. Adapter request interface 522 is implemented by and exported from EM adapter 308, while OEM callback interface 524 is implemented by and exported from OEM server 306. These interfaces are constructed to conform to an adapter request API and an OEM callback API, respectively.

EM frameworks 304 and management agents 302 are adapted for use with OEM gateway 300 through the use of OEM request interface 518, client callback interface 520, adapter request interface 522 and OEM callback interface 524. To adapt a management agent 302, the management agent 302 is configured to use OEM request interface 518 to export and maintain object hierarchy 400. The use by the management agent 302 must conform to the OEM request API. The management agent 302 is also configured to export client callback interface 520. The exported client callback interface 520 must conform to the client callback API.

Adapting an EM framework 304 requires fabrication of an appropriate EM adapter 308. The EM adapter 308 is configured to implement and export adapter request interface 522. The exported adapter request interface 522 must conform to the adapter request API. The EM adapter 308 is also configured to use OEM callback interface 524. The use by the EM adapter 308 must conform to the OEM callback API.

The methods included in OEM request API 518, client callback API 520, adapter request API 522, OEM callback API 524 will be described in detail in the following section.

OEM Request API (management agents 302 to OEM server 306)

The OEM Request API defines the interface that management agents use to access the Open Enterprise Management Gateway.

The examples included in the following descriptions are given using Visual Basic-like pseudo code; they might not be syntactically correct for Visual Basic or any other environment.

ReportingLevels

ReportingLevels returns the number of levels the OEM Server requires in the object hierarchy. All management agents must ensure that they report objects at this level. For example, if ReportingLevels is 3, the OEM Server will expect to receive objects in the form "\<node>\<entity type>\<object name>", where <node>is a node name, <entity type>is the type of object being reported on (for example, CPU or DISK), and <object name>is the name of the actual object. If ReportingLevels is 1, only "\<node>" would be expected.

If all management agents do not abide by this convention, unpredictable results could occur.

Function ReportingLevels() As Integer

Parameters: None

Return Value: The number of levels in the OEM Server object hierarchy

Considerations: All management agents using the OEM must determine the supported ReportingLevels before reporting objects to the OEM, and must report only at that level.

Since ReportingLevels is user-configurable, management agents should check the value prior to every OEM update.

Example:
Dim OEM As New OEMClass
Dim Levels As Integer
Levels=OEM.ReportingLevels Popup.Add Popup.Add is used to add a popup menu for a given entity (class or object) to the EM Framework The framework subsequently uses the popup to direct commands back to the OEM Gateway, which in turn passes them through to the appropriate management agent.

In some cases, the framework might not support true dynamic menus, instead relying on static menus or other means of invoking commands against objects. In these cases, the popups might not be added to the framework, but popup menu definitions are still required by the OEM Gateway to route these commands to the correct management agent.

Function Popup.Add(EntityName As String, MenuCaption As String, CallbackCommand As String, CallbackObject As Object, CallbackAppName As String, CallbackClassName As String, CallbackType As String, ClientName As String) As Integer Parameters: EntityName (input) is the name of the entity to which the popup applies. This menu can be associated with entries at any level in the object hierarchy. For example, specifying "CPU" for the EntityName associates the popup menu with all CPU objects. Specifying "\Dallas\CPU\0" associates the menu only with CPU 0 on node Dallas.

MenuCaption (input) is the caption that will appear on the popup menu for this item.

CallbackCommand (input) is the command returned to the management agent when this menu item is selected. This can be any text, and is completely at the discretion of the management agent. This allows management agents to determine what command they receive when a particular menu item is chosen, instead of requiring the OEM Gateway or EM framework to impose a set of rules.

CallbackObject (input) is the management agent's instantiated callback object. This must be specified, otherwise the OEM Gateway will not be able to pass the command back to the management agent.

CallbackAppName (input) is the fully qualified (path included) name of the management agent. This is retained by the OEM Gateway to programmatically start the management agent if needed.

CallbackClassName (input) is the name of the management agent's callback class. This is required in cases where the CallbackObject reference has no become invalid and the OEM Gateway must create a new callback object for the management agent in order to return command information.

CallbackType (input) specifies whether this is a special type of menu item and callback, as follows:

"<DoubleClick>" causes the management agent to receive an automatic callback when a user double-clicks an item in the framework where the object class name matches EntityName (for example, EntityName is "Disk", and the user double-clicks Disk in the framework). This allows default actions to be associated with double-click events, rather than requiring a user to always bring up the complete popup menu.

"<Click>" causes the management agent to receive an automatic callback when a user clicks an item in the framework where the object class name matches EntityName (for example, EntityName is "Disk", and the user clicks Disk in the framework). This allows default actions to be associated with click events, rather than requiring a user to always bring up the complete popup menu.

Set this parameter to "" to disable any special handling for this menu item. Not all frameworks will support this feature.

ClientName (input) is a management agent-defined name used to identify the owner of the popup. For most management agents this can simply be the application name. However, more complex management agents could wish to use more than one ClientName and CallbackObject to localize processing for different types of commands (for example, one ClientName and CallbackObject for DISK commands, and another for CPU commands).

Return Value: 0 if the request was queued successfully. An OEM error number if an error occurred.

Considerations: For a management agent to receive "Max Alert" callback commands, it must add a popup entry with the caption "Max Alert". When the user selects "Max Alert" from the popup menu, the OEM Gateway determines which management agent is reporting the highest alert level for the selected object and callback to that management agent using the specified CallbackObject.

For a management agent to enable Alert callbacks, it must add a popup entry with the caption "Alerts". When the user selects "Alerts" from the popup menu, the OEM Gateway displays a list of all management agents reporting an alert for the selected object. The user can then choose which one is of interest, and the OEM Gateway will callback to the appropriate management agent using the specified CallbackObject.

If the given MenuCaption already exists for this EntityName, the user can choose the desired management agent whenever that menu item is selected. For example, assume both NsxGem and OMF GUI add a menu item with caption "Status" to the "CPU" entity. If a user subsequently chooses the "Status" item from a popup menu in the framework, the OEM Gateway will display a dialog listing both management agents. The user can then navigate to the appropriate management agent.

Example:

Dim OEM As New OEMClass

Dim MyCallbackObject As New MyCallbackClass

Dim RC As Integer

RC=OEM.Popup.Add("DISK", "Disk Performance", "DISK PERFORMANCE COMMAND", MyCallBackObject, App.Path & App.EXEName, "MyClient.MyCallbackClass", "MyClientName")

In this example, a popup menu item is added for all DISK entities. The caption that will appear on the menu is "Disk Performance". When a user selects this item, the command "DISK PERFORMANCE COMMAND" is passed back to the management agent.

Popup.Delete

Popup.Delete is used to remove a popup menu for a given entity (class or object) from the EM Framework.

In some cases, the framework might not support true dynamic menus, instead relying on static menus or other means of invoking commands against objects. In these cases, the popups might not be removed from the framework, but the OEM Gateway still maintains popup menu definitions internally for popups added using the Popup.Add method. Removing one of these popups will allow the OEM Gateway to alter its callback mechanism for the affected entity.

Function Popup.Delete(EntityName As String, MenuCaption As String, ClientName As String) As integer Parameters: EntityName (input) is the name of the entity to which the popup applies. This menu can be associated with entries at any level in the object hierarchy. For example, specifying "CPU" for the EntityName associates the popup menu with all CPU objects. Specifying "\Dallas\CPU\0" associates the menu only with CPU 0 on node Dallas.

MenuCaption (input) is the caption that appears on the popup menu for this item.

ClientName (input) is a management agent-defined name used to identify the owner of the popup. For most management agents this can simply be the application name. However, more complex management agents could wish to use more than one ClientName and CallbackObject to localize processing for different types of commands (for example, one ClientName and CallbackObject for DISK commands, and another for CPU commands).

Return Value: 0 if the request was queued successfully. An OEM error number if an error occurred.

Considerations: In order for a management agent to remove a popup, it must first have added it using the Popup.Add method.

Example:

Dim OEM As New OEMClass

Dim RC As Integer

RC=OEM.Popup.Delete("DISK", "Disk Performance", "MyClientName") In this example, the popup menu Item "Disk Performance" is removed for all DISK entities.

Popup.Cleanup

Popup.Cleanup is used to remove all popup menus for a given management agent name. This is particularly useful when a management agent is shutting down and all popups associated with it must be removed from the OEM Gateway and EM framework.

Function Popup.Cleanup(ClientName As String) As Integer

Parameters: ClientName (input) is a management agent-defined name used to identify the owner of the popups. For most management agents this can simply be the application name. However, more complex management agents could wish to use more than one ClientName and CallbackObject to localize processing for different types of commands (for example, one ClientName and CallbackObject for DISK commands, and another for CPU commands).

Return Value: 0 if the request was queued successfully. An OEM error number if an error occurred.

Considerations: In order for a management agent to remove any popups, it must first have added them using the Popup.Add method.

If a management agent is using multiple ClientNames, it should call Popup.Cleanup for each of these names when shutting down.

Example:

Dim OEM As New OEMClass

Dim RC As Integer

RC=OEM.Popup.Cleanup("MyClientName")

In this example, all popup menu items associated with "MyClientName" are removed.

ObjectAdd

Object.Add is used to add objects to the EM Framework. Multiple objects can be added as part of a single operation by blocking them together. While the OEM Gateway could require that management agents report objects at level n, the EM framework adapter could report at a higher level. In these cases, only the higher-level objects will be added to the framework.

Function Object.Add(Path As String, ObjectNames As String, CallbackObject As Object, ClientName As String) As Integer Parameters: Path (input) is the full path of all objects included in ObjectNames, for example "\NewYork". If this value is not , it will be prefixed to each item contained in the ObjectNames list. This simplifies building the ObjectNames list for management agents in cases where a large number of objects are to be added.

ObjectNames (input) is a comma-separated list of all objects to be added, along with their states and any associated context. The format of ObjectNames is:

<ObjectName>[:<State>[:<Context>]][,<ObjectName>[:<State>[:<Context>]], ... ]

where <ObjectName> is the fully qualified name of the object (unless a Path has been specified), <State> is the numerical state of the object, and <Context> is optional text enclosed in double quotation marks ("). <Context> is retained by the OEM Gateway for each object, and displayed along with the object name during Alerts processing.

CallbackObject (input) is the management agent's instantiated callback object. All framework notifications or commands associated with the objects added in this operation will be returned through the supplied CallbackObject. If this value is Nothing, the callback object associated with the given ClientName will be used.

ClientName (input) is a management agent-defined name used to identify the owner of a particular object and determine the related callback object. For most management agents this can simply be the application name. However, more complex management agents could wish to use more than one ClientName and CallbackObject to localize processing for different types of commands (for example, one ClientName and CallbackObject for DISK commands, and another for CPU commands).

Return Value: 0 if the request was queued successfully.
An OEM error number if an error occurred.

Considerations: It is not necessary to specify a <State> and <Context> for each object in ObjectNames. If you do not include <State> and/or <Context> information, the default values of 0 and "", respectively, will be used. However, you must include a <State>if you wish to include <Context>.

Example:
Dim OEM As New OEMClass
Dim MyCallbackObject As New MyCallbackClass
Dim RC As Integer
RC=OEM.Object.Add("\Chicago", "CPU\0:4:""""High Swap Rate""""", CPU\1:2:""""Moderate Busy Percent""""", MyCallBackObject, "MyClientName")

In this example, the Path "\Chicago" is prefixed to each object name. This causes the object "\Chicago\CPU\0" to be added with state 4, and the object "\Chicago\CPU\1" to be added with state 2.

Object.Delete

Object.Delete is used to remove objects from the EM Framework. Multiple objects can be removed as part of a single operation by blocking them together. While the OEM Gateway could require that management agents report objects at level n, the EM framework adapter could report at a higher level. In these cases, the framework will determine whether the higher level objects should be removed from the framework. In most cases this decision will be based on whether all subordinate objects have been removed.

Function Object.Delete(Path As String, ObjectNames As String, ClientName As String) As Integer Parameters: Path (input) is the full path of all objects included in ObjectNames, for example "\NewYork". If this value is not "", it will be prefixed to each item contained in the ObjectNames list. This simplifies building the Object-Names list for management agents in cases where a large number of objects are to be deleted.

ObjectNames (input) is a comma-separated list of all objects to be deleted. While the standard ObjectNames format of:

<ObjectName>[:<State>[:<Context>]][,<ObjectName>[:<State>[:<Context>]], ... ]

is supported, the <State> and <Context> values are ignored for delete operations.

ClientName (input) is a management agent-defined name used to identify the owner of a particular object and determine the related callback object For most management agents this can simply be the application name. However, more complex management agents might wish to use more than one ClientName and CallbackObject to localize processing for different types of commands (for example, one ClientName and CallbackObject for DISK commands, and another for CPU commands).

Return Value: 0 if the request was queued successfully.
An OEM error number if an error occurred.

Considerations: In order for an object to be deleted from the OEM Gateway and EM framework, it must first have been added using the Object.Add method.

Example:
Dim OEM As New OEMClass
Dim RC As Integer
RC=OEM.Object.Delete("\Chicago", "CPU\0, CPU\1", "MyClientName")

In this example, the Path "\Chicago" is prefixed to each object name. This causes the objects "\Chicago\CPU\0" and "\Chicago\CPU\1" to be removed.

Object.Cleanup

Object.Cleanup is used to remove all objects for a given management agent name. This is particularly useful when a management agent is shutting down and all objects associated with it must be removed from the OEM Gateway and EM framework.

Function Object.Cleanup(ClientName As String) As Integer

Parameters: ClientName (input) is a management agent-defined name used to identify the owner of the objects. For most management agents this can simply be the application name. However, more complex management agents might wish to use more than one ClientName and CallbackObject to localize processing for different types of commands (for example, one ClientName and CallbackObject for DISK commands, and another for CPU commands).

Return Value: 0 if the request was queued successfully.
An OEM error number if an error occurred.

Considerations: In order for a management agent to remove any objects, it must first have added them using the Object.Add method.

If a management agent is using multiple ClientNames, it should call Object.Cleanup for each of these names when shutting down.

Example:

Dim OEM As New OEMClass

Dim RC As Integer

RC=OEM.Object.Cleanup("MyClientName")

In this example, all objects associated with "MyClientName" are removed.

LogMessage

LogMessage is used to add an event message to the OEM event log. This log serves as a central source of information relating to the OEM environment, and can be viewed by users through the OEM main window.

Management agents can use this facility to keep a record of errors encountered interacting with the OEM, to log application state information regarding the OEM, or other such tasks.

Sub LogMessage(ClientName As String, ClientMessageNumber As Long, MessageText As String, Severity As Integer)

Parameters: ClientName (input) is a management agent-defined name used to identify the source of the event message.

ClientMessageNumber (input) is a management agent-defined message number for this event. The OEM Server does nothing with this value other than display it in the log, so multiple management agents can use the same message numbers.

MessageText (input) is the event text.

Severity (input) is the severity associated with the message, on a scale of 0 (lowest: informational message) to 3 (highest: critical problem). The OEM Server log display will be sorted in descending order by event severity.

Return Value: None

Considerations: The OEM Server will automatically add the date and time to each logged message; management agents do not need to include this in the MessageText field.

Example:

Dim OEM As New OEMClass

OEM.LogMessage "MyClientName", 1312, "Unknown command received from OEM", 1

In this example, the management agent logs its message 1312 with severity 1.

DebugDisplayPopups

DebugDisplayPopups causes the OEM server to display a list of all popup menus currently maintained in the OEM configuration. This is useful when debugging management agents to determine if Popup.Add, Popup.Delete, and Popup.Cleanup calls are having the desired results.

Sub DebugDisplayPopups()

Parameters: None

ReturnValue: None

Considerations: None

Example:

OEM.DebugDisplayPopups

DebugDisplayObjects

DebugDisplayObjects causes the OEM server to display a list of all objects currently maintained in the OEM configuration. This is useful when debugging management agents to determine if Object.Add, Object.Delete, and Object.Cleanup calls are having the desired results.

Sub DebugDisplayObjects()

Parameters: None

Return Value: None

Considerations: None

Example:

OEM.DebugDisplayObjects

DebugTraceEnable

DebugTraceEnable causes the OEM server to display a trace window and log all request and command activity This can be useful in diagnosing management agent problems during development. Trace information includes all requests from management agents, requests sent to the EM framework adapter, commands received from the EM framework adapter, commands passed through to management agents, and key internal information.

Sub DebugTraceEnable()

Parameters: None

Return Value: None

Considerations: None

Example:

OEM.DebugTraceEnable

DebugTraceDisable

DebugTraceDisable causes the OEM server to stop tracing.

Sub DebugTraceDisable()

Parameters: None

Retum Value: None

Consideration:

Tracing must first have been enabled using DebugTraceEnable

Example:

OEM. DebugTraceDisable

DebugQueuePause

DebugQueuePause suspends processing of the OEM servers request queue. This allows a number of management agent requests to be queued without updating active adapters or display forms.

Sub DebugQueuePause()

Parameters: None

Return Value: None

Consideration:

Queue processing can be re-activated using DebugQueueResume

Example:

OEM.DebugQueuePause

DebugQueueResume

DebugQueueResume activates processing of the OEM server's request queue.

Sub DebugQueueResume()

Parameters: None

Return Value: None

Consideration:

Queue processing must have been suspended previously using DebugQueuePause

Example:
OEM.DebugQueueResume

Client Callback API (OEM to Management agent)

The Client Callback API defines the set of methods and properties that management agents must include in their callback class definition so the Open Enterprise Management Gateway can pass back command information.

The examples included in the following descriptions are given using Visual Basic-like pseudo code; they might not be syntactically correct for Visual Basic or any other environment.

Command

The Command method is used to return framework command information to the management agent. This method will be called for a given callback object whenever the user selects a popup menu item associated with that callback.

Function Command(Path As String, ObjectName As String, CallbackCommand As String) As Integer Parameters: Path (input) is the full path of the selected object. For example, if the selected object is "\NewYork\DISK\$SYSTEM", Path will be "\NewYork\DISK".

ObjectName (input) is the name of the selected object. For example, if the selected object is "\NewYork\DISK\$SYSTEM", ObjectName will be "$SYSTEM".

CallbackCommand (input) is the command corresponding to the menu item chosen by the user.

Return Value: 0 if the manage has accepted and handled the command.

Non-zero if the management agent cannot or will not process the command.

Considerations: The value of CallbackCommand is set by the management agent using the Popup.Add method. Whatever text was specified in the CallbackCommand parameter when the popup was added is returned, unaltered, to the management agent when the user selects the menu item.

The OEM Gateway only evaluates the return value as zero or non-zero. A zero return value from the call indicates that the management agent has accepted the command, while a non-zero value indicates the management agent cannot or will not process the command. It is important that management agents return the appropriate value, since the OEM Gateway could behave differently based on the outcome of the call.

Example:

Dim RC As Integer

ClientCallbackObject was passed in a Popup.Add or Object.Add call

RC=ClientCallbackObject.Command("\East\CPU", "3", "CPU State")

In this example, the command "CPU State" is passed back to the management agent for object "\East\CPU\3". The "CPU State" callback command was originally added by the management agent using the Popup.Add method.

ClientMessage

The ClientMessage method is used to pass framework-specific requests or commands to a management agent. This allows a management agent to include custom features for a specific framework, or a framework to include custom features for a specific management agent. In either case, the OEM Gateway acts as a simple routerdpass-through server; any data sent from the framework is passed unaltered to the specified management agent.

Function ClientMessage(ClientName As String, Path As String, ObjectName As String, Message As String) As Integer Parameters: ClientName (input) is the name of the management agent to receive the message.

Path (input) is the full path of the selected object. For example, if the selected object is "\NewYork\DISK\$SYSTEM;, Path will be "\NewYork\DISK". This value can be "" if the message does not relate to a specific object.

ObjectName (input) is the name of the selected object. For example, if the selected object is "\NewYork\DISK\$SYSTEM", ObjectName will be "$SYSTEM". This value can be "" if the message does not relate to a specific object.

Message (input) is the message to be passed to the management agent.

Return Value: 0 if the management agent has accepted and handled the message.

Non-zero if the management agent cannot or will not process the message.

Consideratons: The OEM Gateway determines the callback object for the message based on the given ClientName; therefore, the management agent must previously have made itself known to the OEM Gateway by specifying ClientName in a Popup.Add or Object.Add call.

The OEM Gateway only evaluates the return value as zero or non-zero. A zero return value from the call indicates that the management agent has accepted the command, while a non-zero value indicates the management agent cannot or will not process the command. It is important that management agents return the appropriate value, since the OEM Gateway could behave differently based on the outcome of the call.

Example:

Dim RC As Integer

ClientCallbackObject was passed in a Popup.Add or Object.Add call

RC=ClientCallbackObject.ClientMessage ("MyClientName", "Custom Framework Message")

In this example, the message "Custom Framework Message" is passed back to the management agent corresponding to "MyClientName".

Move

The Move method is used to inform the management agent that it should move its display window so that its top left corner is at the specified coordinates.

Function Move(Left As Single, Top As Single) As Integer

Parameters: Left (input) is the new left position of the window.

Top (input) is the new top of the window.

Return Value: 0 if the management agent has accepted and handled the request.

Non-zero if the management agent cannot or will not process the request.

Considerations: This method is called by the OEM Gateway when the user or framework has invoked a window management function (for example, Tile or Cascade).

The management agent determines which window should be positioned. It could be the main window for the application, or it could be a subordinate window that is responsible for displaying information relevant to the framework or callback object. This is a request only; the management agent can choose not to position the window if necessary (for example, if the user has already explicitly positioned the window).

The OEM Gateway only evaluates the return value as zero or non-zero. A zero return value from the call indicates that the management agent has accepted the command, while a non-zero value indicates the management agent cannot or will not process the command. It is important that management agents return the appropriate value, since the OEM Gateway could behave differently based on the outcome of the call.

Example:

Dim RC As Integer

ClientCallbackObject was passed in a Popup.Add or Object.Add call

Assume FrameworkWindow is defined elsewhere in the OEM

RC=ClientCallbackObject.Move (FrameworkWindow.Left+10, FrameworkWindow.Top+10)

In this example, the OEM Gateway has requested that the management agent position the upper left comer of its window 10 pixels to the right and 10 pixels down from the main framework window.

Height

The Height method is used to inform the management agent that it should adjust the height of its display window to the new value.

Function Height(NewHeight As Single) As Integer

Parameters: NewHeight (input) is the new height of the window.

Return Value: 0 if the management agent has accepted and handled the request.

Non-zero if the management agent cannot or will not process the request.

Considerations: This method is called by the OEM Gateway when the user or framework has invoked a window management function (for example, Tile or Cascade).

The management agent determines which window should be adjusted. It could be the main window for the application, or it could be a subordinate window that is responsible for displaying information relevant to the framework or callback object. This is a request only; the management agent can choose not to adjust the window height if necessary (for example, if the user has already explicitly set the height of the window).

The OEM Gateway only evaluates the return value as zero or non-zero. A zero return value from the call indicates that the management agent has accepted the command, while a non-zero value indicates the management agent cannot or will not process the command. It is important that management agents return the appropriate value, since the OEM Gateway could behave differently based on the outcome of the call.

Example:

Dim RC As Integer

ClientCallbackObject was passed in a Popup.Add or Object.Add call

Assume FrameworkWindow is defined elsewhere in the OEM

RC=ClientCallbackObject.Height (FrameworkWindow.Height/2)

In this example, the OEM Gateway has requested that the management agent adjust the height of its window to be half the height of the framework window.

Width

The Width method is used to inform the management agent that it should adjust the width of its display window to the new value.

Function Height(NewWidth As Single) As Integer

Parameters: NewWidth (input) is the new width of the window.

Returh Value: 0 if the management agent has accepted and handled the request.

Non-zero if the management agent cannot or will not process the request.

Considerations: This method is called by the OEM Gateway when the user or framework has invoked a window management function (for example, Tile or Cascade).

The management agent determines which window should be adjusted. It could be the main window for the application, or it could be a subordinate window that is responsible for displaying information relevant to the framework or callback object. This is a request only; the management agent can choose not to adjust the window width if necessary (for example, if the user has already explicitly set the width of the window).

The OEM Gateway only evaluates the return value as zero or non-zero. A zero return value from the call indicates that the management agent has accepted the command, while a non-zero value indicates the management agent cannot or will not process the command. It is important that management agents return the appropriate value, since the OEM Gateway could behave differently based on the outcome of the call.

Example:

Dim RC As Integer

ClientCallbackObject was passed in a Popup.Add or Object.Add call

Assume FrameworkWindow is defined elsewhere in the OEM

RC=ClientCallbackObject.Width (FrameworkWindow.Width/2)

In this example, the OEM Gateway has requested that the management agent adjust the width of its window to be half the width of the framework window.

WindowCaption

The WindowCaption method returns the caption of the management agents display window.

Function WindowCaption() As String

Parameters: None

Retum Value: The window caption of the management agent's display window.

Considerations: This method is used by the OEM Gateway and/or EM framework to assist users in navigating to the correct management agent.

The management agent determines which window's caption is returned. It could be the main window for the application, or it could be a subordinate window that is responsible for displaying information relevant to the framework or callback object.

Example:

Dim ThisCaption As String

ClientCallbackObject was passed in a Popup.Add or Object.Add call

ThisCaption=ClientCallbackObject.WindowCaption

WindowState

The WindowState method should be implemented by the management agent as a pair of property procedures—Property Get (read) and Property Let (write). The OEM Gateway retrieves this value to determine the current state (normal, minimized, maximized) of the management agent's display window, and also sets the state of the window when requested by the user.

Property Get WindowState() As Integer

Parameters: None

Return Value: The current state of the management agent's display window, corresponding to standard VB window state constants (vbNormal, vbNormal, vbMaximized, vbMinimized).

Considerations: This property is used by the OEM Gateway when the user or framework has invoked a window management function (for example, Minimize All or Restore All).

The management agent determines for which window it will return data. It could be the main window for the application, or it could be a subordinate window that is responsible for displaying information relevant to the framework or callback object.

Example:

Dim WS As Integer

ClientCallbackObject was passed in a Popup.Add or Object.Add call

WS=ClientCallbackObject.WindowState

Property Let WindowState(vNewValue)

Parameters: vNewValue (input) is the new window state.

Return Value: None

Considerations: This property is set by the OEM Gateway when the user or framework has invoked a window management function (for example, Minimize All or Restore All).

The management agent determines which window is impacted by the operation. It could be the main window for the application, or it could be a subordinate window that is responsible for displaying information relevant to the framework or callback object. The management agent can choose to ignore the request and not alter the state of any window if necessary.

Example:

ClientCallbackObject was passed in a Popup.Add or Object.Add call

ClientCallbackObject.WindowState=vbMinimized

In the above example, the management agent window would be minimized

Framework Adapter

This chapter describes architecture and design considerations for framework adapters: the Adapter Request API, the OEM Callback API, and the Adapter Callback API.

Architecture and Design Considerations

The Enterprise Management framework adapter (EM Adapter) is responsible for interfacing with a specific enterprise management framework. Requests received from the OEM Server are translated to framework-specific operations and passed to the framework. Subsequent commands received from the framework are translated to standard OEM Server operations and passed back to the server (and eventually the management agent).

The OEM Server communicates with the adapter using OLE Automation. The adapter, therefore, must be an OLE AcfiveX server, either in-process (DLL) or out-of-process (EXE).

For an adapter to function properly within the OEM environment, it must:

Fully implement the Adapter Request API.

Use the OEM Callback API to communicate with the OEM Server.

In some instances, the framework might not support the full set of features available in the OEM environment. If this is the case, the adapter still must implement the complete Adapter Request API, even if a particular request has no meaning for the framework.

The adapter design should also take into account the fact that some frameworks could take a significant amount of time to process a request, which blocks the requester as a result. If this is the case for a particular framework, the adapter should be developed as an ActiveX EXE so that it has its own thread of execution. In addition, it should queue requests from the OEM Server and immediately reply back to it to prevent it from being blocked while the framework services the request.

Adapter Request API (OEM to Adapter)

The Adapter Request API defines the interface that the OEM Server uses to communicate with the EM Adapter.

The examples included in the following descriptions are given using Visual Basic-like pseudo code; they might not be syntactically correct for Visual Basic or any other environment.

Popup.Add

Popup.Add is used to add a popup menu for a given entity (class or object) to the framework. The framework subsequently uses the popup to direct commands back to the OEM Gateway, which in turn passes them through to the appropriate management agent.

In some cases, the framework might not support true dynamic menus, instead relying on static menus or other means of invoking commands against objects. In these cases, the adapter could choose to do nothing with the information received, but it must support the method.

Function Popup.Add(EntityName As String, MenuCaption As String, CallbackObject As Object, CallbackAppName As String, CallbackClassName As String, CallbackType As String) As Integer Parameters: EntityName (input) is the name of the entity to which the popup applies. This menu can be associated with entries at any level in the object hierarchy. For example, specifying "CPU" for the EntityName associates the popup menu with all CPU objects. Specifying "\Dallas\CPU\0" associates the menu only with CPU 0 on node Dallas.

MenuCaption (input) is the caption that will appear on the popup menu for this item.

CallbackObject (input) is the OEM Server's instantiated callback object.

CallbackAppName (input) is the fully-qualified (path included) name of the OEM Server. This can be retained by the adapter to programmatically start the server if needed.

CallbackClassName (input) is the name of the OEM Servers callback class. This is required in cases where the CallbackObject reference has become invalid and the adapter needs to create a new callback object for the server to return command information.

CallbackType (input) specifies whether this is a special type of menu item and callback, as follows:

"<DoubleClick>" causes the management agent to receive an automatic callback when a user double-clicks an item in the framework where the object class name matches EntityName (for example, EntityName is "Disk", and the user double-clicks Disk in the framework). This allows default actions to be associated with double-click events, rather than requiring a user to always bring up the complete popup menu.

"<Click>" causes the management agent to receive an automatic callback when a user clicks an item in the framework where the object class name matches EntityName (for example, EntityName is "Disk", and the user clicks Disk in the framework). This allows default actions to be associated with click events, rather than requiring a user to always bring up the complete popup menu.

Set this parameter to "" to disable any special handling for this menu item. Not all frameworks will support this feature.

Return Value: 0 if the request was accepted by the adapter. Non-zero if the adapter cannot service the request.

Considerations: The OEM Gateway only evaluates the return value as zero or non-zero. A zero return value from the call indicates that the adapter has accepted the request, while a non-zero value indicates the adapter cannot or will not process the request. It is important that the adapter return the appropriate value, since the OEM Server could behave differently based on the outcome of the call.

Example:

Dim Adapter As New EMAdapterClass

Dim OEMServerCallbackObject As New OEMServer-CallbackClass

Dim RC As Integer

RC=Adapter.Popup.Add("DISK", "Disk Performance", OEMServerCallbackObject, App.Path & App.EXEName, "OEMServer.OEMServerCallbackClass")

In this example, a popup menu item is added for all DISK entities. The caption that will appear on the menu is "Disk Performance".

Popup.Delete

The Popup.Delete method is used to remove a popup menu for a given entity (class or object) from the framework.

In some cases, the framework might not support true dynamic menus, instead relying on static menus or other means of invoking commands against objects. In these cases, the adapter could choose to do nothing with the information received, but it must support the method.

Function Popup.Delete(EntityName As String, MenuCaption As String) As Integer

Parameters: EntityName (input) is the name of the entity to which the popup applies. This menu can be associated with entries at any level in the object hierarchy. For example, specifying "CPU" for the EntityName associates the popup menu with all CPU objects. Specifying "\Dallas\CPU\0" associates the menu only with CPU 0 on node Dallas.

MenuCaption (input) is the caption that appears on the popup menu for this item.

Return Value: 0 if the request was accepted by the adapter. Non-zero if the adapter cannot service the request.

Considerations: The OEM Gateway only evaluates the return value as zero or non-zero. A zero return value from the call indicates that the adapter has accepted the request, while a non-zero value indicates the adapter cannot or will not process the request. It is important that the adapter return the appropriate value, since the OEM Server could behave differently based on the outcome of the call.

Example:

Dim Adapter As New EMAdapterClass

Dim RC As Integer

RC=Adapter.Popup.Delete("DISK", "Disk Performance")

In this example, the popup menu item "Disk Performance" is removed for all DISK entities.

Popup.Clear

The Popup.Clear method is used to remove all popups from the EM framework. This is particularly useful when the OEM Gateway and its management agents are shutting down and non-functioning menu items must be removed from the framework.

Function Popup.Clear() As Integer

Parameters: None

Return Value: 0 if the request was accepted by the adapter. Non-zero if the adapter cannot service the request.

Considerations: The adapter should only remove popups added by the OEM and its management agents. Popups added through other mechanisms should remain within the framework.

Example:

Dim Adapter As New EMAdapterClass

Dim RC As Integer

RC=Adapter.Popup.Clear

Object.Add

The Object.Add method is used to add objects to the EM Framework. Multiple objects can be added as part of a single operation by blocking them together. While the OEM Server can report objects at level n, the framework itself could report at a higher level. It is the adapter's responsibility to roll up objects and propagate states as needed if this is the case.

Function Object.Add(Path As String, ObjectNames As String, CallbackObject As Object) As Integer Parameters: Path (input) is the full path of all objects included in ObjectNames, for example "\NewYork". If this value is not "", it will be prefixed to each item contained in the ObjectNames list. This simplifies building the ObjectNames list for the OEM Server in cases where a large number of objects are to be added.

ObjectNames (input) is a comma-separated list of all objects to be added, along with their states. The format of ObjectNames is:

<ObjectName>[:<State>][,<ObjectName>[:<State>], . . . ]

where <ObjectName> is the fully qualified name of the object (unless a Path has been specified) and <State> is the numerical state of the object.

CallbackObject (input) is the OEM Server's instantiated callback object. The adapter will use this object to pass command information from the framework back to the OEM Server.

Return Value: 0 if the request was accepted by the adapter. Non-zero if the adapter cannot service the request.

Considerations: <State> might not be specified for every object in the ObjectNames list.

The OEM Gateway only evaluates the return value as zero or non-zero. A zero return value from the call indicates that the adapter has accepted the request, while a non-zero value indicates the adapter cannot or will not process the request. It is important that the adapter return the appropriate value, since the OEM Server could behave differently based on the outcome of the call.

Example:
Dim Adapter As New EMAdapterClass
Dim OEMServerCallbackObject As New OEMServer-CallbackClass
Dim RC As Integer
RC=Adapter.Object.Add("\Chicago", "CPU\0:4, CPU\1:2", OEMServerCallbackObject)

In this example, the Path "\Chicago" is prefixed to each object name. This causes the object "\Chicago\CPU\0" to be added with state 4, and the object "\Chicago\CPU\1" to be added with state 2.

Object.Delete

The Object.Delete is used to remove objects from the EM Framework. Multiple objects can be removed as part of a single operation by blocking them together. While the OEM Server reports objects at level n, the framework itself could report at a higher level. In these cases, the adapter and framework determine whether the higher level objects should be removed from the framework. In most cases, this decision will be based on whether all subordinate objects have been removed.

Function Object.Delete(Path As String, ObjectNames As String) As Integer

Parameters: Path (input) is the full path of all objects included in ObjectNames, for example "\NewYork". If this value is not , it will be prefixed to each item contained in the ObjectNames list. This simplifies building the ObjectNames list for the OEM Server in cases where a large number of objects are to be deleted.

ObjectNames (input) is a comma-separated list of all objects to be deleted. While the standard ObjectNames format of:

<ObjectName>[:<State>][,<ObjectName>[:<State>], . . . ]

is supported, the <State>values are ignored for delete operations.

Return Value: 0 if the request was accepted by the adapter. Non-zero if the adapter cannot service the request.

Considerations: Delete requests from management agents will first pass through the OEM Server. Once all references to a particular object have been removed, the OEM Server will generate a delete request for that object and pass it to the adapter.

Example:
Dim Adapter As New EMAdapterClass
Dim RC As Integer
RC=Adapter.Object.Delete("\Chicago", "CPU\0, CPU\1") In this example, the Path "\Chicago" is prefixed to each object name. This causes the objects "\Chicago\CPU\0" and "\Chicago\CPU\1" to be removed.

Object.Clear

The Object.Clear method is used to remove all objects from the EM framework. This is particularly useful when the OEM Gateway and its management agents are shutting down and objects must be removed from the framework.

Function Object.Clear() As Integer
Parameters: None
Return Value: 0 if the request was accepted by the adapter. Non-zero if the adapter cannot service the request.

Considerations: The adapter should only remove objects added by the OEM and its management agents. Objects added through other mechanisms should remain within the framework.

Example:
Dim Adapter As New EMAdapterClass
Dim RC As Integer
RC=Adapter.Object.Clear

AdapterName

The AdapterName method is used to allow the OEM Server to determine the name of a particular adapter. This is used by the OEM when displaying messages and performing other such tasks.

Function AdapterName() As String
Parameters: None
Return Value: The name of the adapter
Considerations: None
Example:
Dim Adapter As New EMAdapterClass
Dim AdptName As String
AdptName=Adapter.AdapterName

IsConfigurable

The IsConfigurable method is used to allow the OEM Server to determine whether a particular adapter can be configured. If this value is true, the OEM Server will call the adapter's Configure method when requested by the user. If this value is false, the user will not be able to alter the adapter.

Function IsConfigurableo As Boolean
Parameters: None
Return Value: True if the adapter can be configured, false if it cannot.

Considerations: If this value is true, the adapter's Configure method will be called as needed. If this value is false, the adapter's Configure method will not be called.

Example:
Dim Adapter As New EMAdapterClass
Dim Config As Boolean
Config=Adapter.IsConfigurable

Configure

The Configure method is used to allow the user to set any adapter-specific options. The OEM Gateway contains a configuration interface; through this facility, users can also specify adapter properties. The adapters Configure method will be called whenever the user attempts to set adapter options. At that point, the adapter can display a modal dialog to allow the user to alter adapter parameters as needed.

Function Configure() As Integer
Parameters: None
Return Value: 0 if the adapter supports user-configurable options.

Non-zero if the adapter does not support user-configurable options.

Considerations: The adapter should return zero if it displayed a configuration dialog, or non-zero if it did not. If a non-zero value is returned, the OEM Server will inform the user that no user-configurable options were available.

Example:

Dim Adapter As New EMAdapterClass

Dim RC As Integer

RC=Adapter.Configure

FrameworkWindowPosition

The FrameworkWindowPosition method is used to allow the OEM Server to determine the position and size of the main framework window These values are subsequently used by the OEM when performing window management functions.

Function FrameworkWindowPosition(Left As Single, Top As Single, Width As Single, Height As Single) As Integer Parameters: Left (output) is the left position of the framework window. This value is returned to the OEM Server.

Top (output) is the top position of the framework window. This value is returned to the OEM Server.

Width (output) is the width of the framework window. This value is returned to the OEM Server.

Height (output) is the height of the framework window. This value is returned to the OEM Server.

Return Value: 0 if the adapter accepted the request.

Non-zero if the adapter cannot accept the request.

Consideration:

If the adapter cannot obtain the size or position of the framework window, it should set each of the parameters to -1 and return a non-zero value.

Example:

Dim Adapter As New EMAdapterClass

Dim RC As Integer

Dim Left As Single

Dim Top As Single

Dim Width As Single

Dim Height As Single

RC=Adapter.FrameworkPosition(Left, Top, Width, Height)

CloseAdapter

The CloseAdapter method is used to inform the adapter that it can shut down. The OEM server will call this method for each adapter when exiting, or for a specific adapter if that adapter is deactivated by the user. Once the OEM server has called this method for an adapter, it will not attempt to communicate with the adapter again without instantiating a new adapter interface object.

Sub CloseAdapter()

Parameters: None

Retum Value: None

Consideration:

The adapter should destroy all references to OEM server objects when this method is called. This will prevent situations in which the server or adapter is prevented from exiting due to outstanding external references.

Example:

Dim Adapter As New EMAdapterClass

Adapter.CloseAdapter

OEM Callback API (Adapter to OEM)

The OEM Callback API defines the set of methods and properties that adapters use to pass command information back to the OEM Server.

The examples included in the following descriptions are given using Visual Basic-like pseudo code; they might not be syntactically correct for Visual Basic or any other environment.

Command

The Command method is used to return framework command information to the OEM Server. This method will be called whenever the user selects a popup menu item in the framework, or when some other means is used to invoke a command.

Function Command(Path As String, ObjectName As String, Caption As String) As Integer Parameters: Path (input) is the full path of the selected object. For example, if the selected object is "\NewYork\DISK\$SYSTEM", Path will be "\NewYork\DISK".

ObjectName (input) is the name of the selected object. For example, if the selected object is "NewYork\DISK\$SYSTEM", ObjectName will be "$SYSTEM".

Caption (input) is the caption of the selected menu item. The OEM Server uses this value to determine which management agent should receive the command.

Return Value: 0 if the OEM Server has accepted and handled the command.

Non-zero if the OEM Server cannot or will not process the command.

Considerations: The Caption item is originally set by the management agent using the Popup.Add method. The caption returned by the framework for that item must be identical to the caption specified by the management agent.

The OEM Gateway will return 0 if it has accepted the command, and non-zero if it has not. If a non-zero value is returned, the adapter is not required to do anything. It could, however, choose to perform some sort of error processing if necessary.

Example:

Dim RC As Integer

OEMServerCallbackObject was passed in a Popup.Add or Object.Add call

RC=OEMServerCallbackObject.Command("\East\CPU", "3", "State")

In this example, the caption "State" is passed back to the OEM Server for object "EastCPU3". The "State" popup was originally added by the management agent using the Popup.Add method.

ClientMessage

The ClientMessage method is used to pass framework-specific requests or commands to a management agent through the OEM Server. This allows a management agent to include custom features for a specific framework, or a framework to include custom features for a specific management agent. In either case, the OEM Gateway acts as a simple routerdpass-through server, any data sent from the framework is passed unaltered to the specified management agent.

Function ClientMessage(ClientName As String, Path As String, ObjectName As String, Message As String) As Integer Parameters: ClientName (input) is the name of the management agent to receive the message.

Path (input) is the full path of the selected object. For example, if the selected object is "\NewYork\DISK\$SYSTEM", Path will be "\NewYork\DISK". This value can be "" if the message does not relate to a specific object.

ObjectName (input) is the name of the selected object. For example, if the selected object is "\NewYork\DlSK\$SYSTEM", ObjectName will be "$SYSTEM". This value can be "" if the message does not relate to a specific object.

Message (input) is the message to be passed to the management agent.

Retum Value: 0 if the OEM Server has accepted and handled the message.

Non-zero if the OEM Server cannot or will not process the message.

Considerations: The OEM Gateway determines the callback object for the message based on the given ClientName, so the management agent must have made itself known previously to the OEM Gateway by specifying ClientName in a Popup.Add or Object.Add call.

The OEM Gateway will return 0 if it has accepted the command, and non-zero if it has not. If a non-zero value is returned, the adapter is not required to do anything. It could, however, choose to perform some sort of error processing if necessary.

Example:

Dim RC As Integer

OEMServerCallbackObject was passed in a Popup.Add or Object.Add call

RC=OEMServerCallbackObject.ClientMessage ("MyClientName", "Custom Framework Message")

In this example, the message "Custom Framework Message" is passed back to the OEM Server, and then on to the management agent corresponding to "MyClientName".

RefreshObjects

The RefreshObjects method causes the OEM Server to repopulate the requesting adapter with all object information. This method can be used by an adapter to ensure that its object information is synchronized with that of the OEM Server.

Function RefreshObjects() As Integer

Parameters: None

Return Value: 0 if the OEM Server has accepted and handled the message.

Non-zero if the OEM Server cannot or will not process the message.

Considerations: The OEM Server queues the request from the adapter and replies immediately; this is necessary to prevent potential deadlocks. Subsequent queue processing causes the adapter to receive an object update through the standard Object.Add mechanism.

The OEM Server does not first clear object information from the adapter. The adapter itself should do this prior to making the RefreshObjects call.

Example:

Dim RC As Integer

OEMServerCallbackObject was passed in a Popup.Add or Object.Add call

RC=OEMServerCallbackObject.RefreshObjects

RefreshPopups

The RefreshPopups method causes the OEM Server to repopulate the requesting adapter with all popup information. This method can be used by an adapter to ensure that its popup information is synchronized with that of the OEM Server.

Function RefreshPopups() As Integer

Parameters: None

Retum Value: 0 if the OEM Server has accepted and handled the message.

Non-zero if the OEM Server cannot or will not process the message.

Considerations: The OEM Server queues the request from the adapter and replies immediately; this is necessary to prevent potential deadlocks. Subsequent queue processing causes the adapter to receive popup updates through the standard Popup.Add mechanism.

The OEM Server does not first clear popup information from the adapter. The adapter itself should do this prior to making the RefreshPopups call.

Example:

Dim RC As Integer

OEMServerCallbackObject was passed in a Popup.Add or Object.Add call

RC=OEMServerCallbackObject.RefreshPopups

Tile

The Tile method is used to allow the EM framework to tile all management agent windows.

Function Tile(Left As Single, Top As Single, Width As Single, Height As Single) As Integer Parameters: Left (input) is the left position of the area in which management agent windows are to be tiled.

Top (input) is the top position of the area in which management agent windows are to be tiled.

Width (input) is the width of the area in which management agent windows are to be tiled.

Height (input) is the height of the area in which management agent windows are to be tiled.

Return Value: 0 if the OEM Server has accepted and handled the message.

Non-zero if the OEM Server cannot or will not process the message.

Considerations: When this method is called, the OEM Server will use each callback object's Move, Height, and Width methods to file management agent windows.

The OEM Gateway will return 0 if it has accepted the command, and non-zero if it has not. If a non-zero value is returned, the adapter is not required to do anything. It could, however, choose to perform some sort of error processing if necessary.

Example:

Dim RC As Integer

OEMServerCallbackObject was passed in a Popup.Add or Object.Add call

Assume FrameworkWindow is defined elsewhere in the adapter

RC=OEMServerCallbackObject.Tile (FrameworkWindow.Left+FrameworkWindow.Width, FrameworkWindow.Top, 200, 300)

In the above example, the adapter requests that the OEM Server tile all management agent windows immediately to the right of the framework window, in an area 200 pixels wide×300 pixels high.

Cascade

The Cascade method is used to allow the EM framework to cascade all management agent windows.

Function Cascade(Left As Single, Top As Single, Width As Single, Height As Single) As Integer Parameters: Left (input) is the left position of the area in which management agent windows are to be cascaded.

Top (input) is the top position of the area in which management agent windows are to be cascaded.

Width (input) is the width of the area in which management agent windows are to be cascaded.

Height (input) is the height of the area in which management agent windows are to be cascaded.

Return Value: 0 if the OEM Server has accepted and handled the message.

Non-zero if the OEM Server cannot or will not process the message.

Considerations: When this method is called, the OEM Server will use each callback object's Move, Height, and Width methods to cascade management agent windows.

The OEM Gateway will return 0 if it has accepted the command, and non-zero if it has not. If a non-zero value is returned, the adapter is not required to do anything. It could, however, choose to perform some sort of error processing if necessary.

Example:

Dim RC As Integer

OEMServerCallbackObject was passed in a Popup.Add or Object.Add call

Assume FrameworkWindow is defined elsewhere in the adapter

RC=OEMServerCallbackObject.Cascade (FrameworkWindow.Left, FrameworkWindow.Top+ FrameworkWindow.Height, 600, 600)

In the above example, the adapter requests that the OEM Server cascade all management agent windows immediately to below the framework window, in an area 600 pixels wide×600 pixels high.

MinimizeAll

The MinimizeAll method is used to allow the EM Framework to minimize all management agent windows.

Function MinimizeAll() As Integer

Parameters: None

Return Value: 0 if the OEM Server has accepted and handled the message.

Non-zero if the OEM Server cannot or will not process the message.

Considerations: When this method is called, the OEM Server will use each callback object's WindowState property to minimize management agent windows.

The OEM Gateway will return 0 if it has accepted the command, and non-zero if it has not. If a non-zero value is returned, the adapter is not required to do anything. It could, however, choose to perform some sort of error processing if necessary.

Example:

Dim RC As Integer

OEMServerCallbackObject was passed in a Popup.Add or Object.Add call

RC=OEMServerCallbackObject.MinimizeAll

RestoreAll

The RestoreAll method is used to allow the EM Framework to restore all management agent windows.

Function RestoreAll() As Integer

Parameters: None

Return Value: 0 if the OEM Server has accepted and handled the message.

Non-zero if the OEM Server cannot or will not process the message.

Considerations: When this method is called, the OEM Server will use each callback object's WindowState property to restore management agent windows.

The OEM Gateway will return 0 if it has accepted the command, and non-zero if it has not. If a non-zero value is returned, the adapter is not required to do anything. It could, however, choose to perform some sort of error processing if necessary.

Example:

Dim RC As Integer

OEMServerCallbackObject was passed in a Popup.Add or Object.Add call

RC=OEMServerCallbackObject.MinimizeAll

LogMessage

LogMessage is used to add an event message to the OEM event log. This log serves as a central source of information relating to the OEM environment, and can be viewed by users from the OEM main window.

Adapters can use this facility to perform tasks such as keeping a record of errors encountered interacting with the OEM or framework or logging adapter state information.

Sub LogMessage(AdapterName As String, AdapterMessageNumber As Long, MessageText As String, Severity As Integer)

Parameters: AdapterName (input) is an adapter-defined name used to identify the source of the event message.

AdapterMessageNumber (input) is an adapter-defined message number for this event. The OEM Server does nothing with this value other than display it in the log, so multiple adapters can use the same message numbers.

MessageText (input) is the event text.

Severity (input) is the severity associated with the message, on a scale of 0 (lowest; informational message) to 3 (highest; critical problem). The OEM Server log display will be sorted in descending order by event severity.

Return Value: None

Consideration:

The OEM Server will automatically add the date and time to each logged message, so adapters do not need to include this in the MessageText field.

Example: (OEMServerCallbackObject was passed in a Popup.Add or Object.Add) call

OEMServerCallbackObject.LogMessage "MyAdapterName", 100, Adapter started", 0

In this example, the adapter logs its message 100 with severity 0.

DebugTraceEnable

DebugTraceEnable causes the OEM server to display a trace window and log all request and command activity. This can be useful in diagnosing adapter problems during development. Trace information includes all requests from management agents, requests sent to the EM framework adapter, commands received from the EM framework adapter, commands passed through to management agents, and key internal information.

Sub DebugTraceEnable()

Parameters: None

Return Value: None

Considerations: None

Example:

OEMServerCallbackObject was passed in a Popup.Add or Object.Add call

OEMServerCallbackObject.DebugTraceEnable

DebugTraceDisable

DebugTraceDisable causes the OEM server to stop tracing.

Sub DebugTraceDisable()

Parameters: None

Return Value: None

Considerations: Tracing must first have been enabled using DebugTraceEnable

Example:

OEMServerCallbackObject was passed in a Popup.Add or Object.Add call

OEMServerCallbackObject. DebugTraceDisable

DebugQueuePause

DebugQueuePause suspends processing of the OEM servers callback command queue. This allows a number of adapter callbacks to be queued without updating management agents.

Sub DebugQueuePause()

Parameters: None

Return Value: None

Consideration:

Queue processing can be re-activated using DebugQueueResume

Example:

OEMServerCallbackObject was passed in a Popup.Add or Object.Add call

OEMServerCallbackObject.DebugQueuePause

DebugQueueResume

DebugQueueResume activates processing of the OEM server's callback command queue.

Sub DebugQueueResume()

Parameters: None

Return Value: None

Consideration:

Queue processing must have been suspended previously using DebugQueuePause

Example:

OEMServerCallbackObject was passed in a Popup.Add or Object.Add call

OEMServerCallbackObject.DebugQueueResume

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A gateway for integrating management agents and EM frameworks, the apparatus comprising:

a first interface for receiving objects exported by one or more management agents, each object corresponding to an entity managed by the exporting management agent;

an first subsystem configured to select objects within the objects received by the first interface;

a second interface for forwarding the selected objects to one or more EM frameworks;

a third interface for receiving callback requests from the EM frameworks, each callback request associated with an exported object;

a second subsystem for selecting a destination management agent for each callback request; and a fourth interface for forwarding each callback request to the destination management agent selected for the callback request.

2. A gateway as recited in claim 1 wherein each exported object has an associated state, and wherein the first subsystem is configured to select, where more than one management agent exports the same object, the object having the state with the highest priority.

3. A gateway as recited in claim 1 wherein the second subsystem is configured to determine if a callback request is specifically associated with a particular object and to select the management agent that exported the particular object as the destination management agent for that callback request.

4. A gateway as recited in claim 1 wherein the second subsystem is configured to determine if a callback request is generically associated with an object class and to select the management agent that exported the object class as the destination management agent for that callback request.

5. A gateway as recited in claim 1 wherein the first interface is configured to receive command interfaces exported by one or more management agents, each command interface corresponding to one or more exported objects and wherein the fourth interface is configured to forward the exported command interfaces to the EM frameworks.

6. A gateway as recited in claim 5 wherein the exported command interfaces are popup menus.

7. A method for integrating management agents and EM frameworks, the method comprising the steps, performed by a computer system, of:

receiving objects exported by one or more management agents, each object corresponding to an entity managed by the exporting management agent;

selecting objects within the objects received by the first interface;

forwarding the selected objects to one or more EM frameworks;

receiving callback requests from the EM frameworks, each callback request associated with an exported object;

selecting a destination management agent for each callback request; and forwarding each callback request to the destination management agent selected for the callback request.

8. A method as recited in claim 7 wherein each exported object has an associated state, and wherein the step of selecting objects within the objects received by the first interface is configured to select, where more than one management agent exports the same object, the object having the state with the highest priority.

9. A method as recited in claim 7 further comprising the steps of:

determining if a callback request is specifically associated with a particular object; and selecting the management agent that exported the particular object as the destination management agent for that callback request.

10. A method as recited in claim 7 further comprising the steps of:

determining if a callback request is generically associated with an object class; and selecting the management agent that exported the object class as the destination management agent for that callback request.

11. A method as recited in claim 7 further comprising the steps of:

receiving command interfaces exported by one or more management agents, each command interface corresponding to one or more exported objects; and forwarding the exported command interfaces to the EM frameworks.

12. A method as recited in claim 11 wherein the exported command interfaces are popup menus.

13. A computer program product comprising:

a computer usable medium having computer readable code embodied therein for providing a gateway for integrating management agents and EM frameworks, the computer program product comprising:

first computer readable program code devices configured to cause a computer system to receive objects exported by one or more management agents, each object corresponding to an entity managed by the exporting management agent;

second computer readable program code devices configured to cause a computer system to select objects within the objects received by the first interface;

third computer readable program code devices configured to cause a computer system to forward the selected objects to one or more EM frameworks;

fourth computer readable program code devices configured to cause a computer system to receive callback requests from the EM frameworks, each callback request associated with an exported object;

fifth computer readable program code devices configured to cause a computer system to select a destination management agent for each callback request; and sixth computer readable program code devices configured to cause a computer system to forward each callback request to the destination management agent selected for the callback request.

14. A computer program product as recited in claim 13 wherein each exported object has an associated state, and wherein the first computer readable program code devices are configured to select, where more than one management agent exports the same object, the object having the state with the highest priority.

15. A computer program product as recited in claim 13 wherein the fifth computer readable program code devices are configured to determine if a callback request is specifically associated with a particular object and to select the management agent that exported the particular object as the destination management agent for that callback request.

16. A computer program product as recited in claim 13 wherein the second computer readable program code devices are configured to determine if a callback request is generically associated with an object class and to select the management agent that exported the object class as the destination management agent for that callback request.

17. A computer program product as recited in claim 13 wherein the first computer readable program code devices are configured to receive command interfaces exported by one or more management agents, each command interface corresponding to one or more exported objects and wherein the fourth interface is configured to forward the exported command interfaces to the EM frameworks.

18. A computer program product as recited in claim 17 wherein the exported command interfaces are popup menus.

* * * * *